Patented May 23, 1939

2,159,507

UNITED STATES PATENT OFFICE 2,159,507

ISOMERIZATION OF ALKYLENE OXIDES

George H. Law, South Charleston, and Raymond W. McNamee, Charleston, W. Va., assignors to Carbide and Carbon Chemicals Corporation, a corporation of New York No Drawing. Application January 22, 1936, Serial No. 60,190

12 Claims. (Cl. 260—601)

The present invention relates to the isomerization of alkylene oxides; and more especially it concerns the catalytic isomerization of 1,2 alkylene oxides having from two to four carbon atoms in the molecule. The invention has special utility in the isomerization of 1,2 propylene oxide for the commercial production of propionaldehyde and allyl alcohol, under conditions minimizing or inhibiting undesired side reactions forming resinous masses and other substances, and causing material losses of the oxide.

Among the more important objects of the invention are: To provide a new and highly effective isomerization catalyst; to provide in novel manner for the isomerization of 1,2 propylene oxide and similar oxides having from two to four carbon atoms in the molecule; and to provide for the production and/or utilization of an isomerization catalyst, in admixture with an oxidizing catalyst having no undesirable effect on an alkylene oxide isomerization reaction, but adapted to facilitate revivification of the isomerization catalyst upon oxidizing the mixture at suitable temperatures.

It is well known that the isomeric compounds, allyl alcohol and propionaldehyde, may be produced by the isomerization of 1,2 propylene oxide, upon passing the vapors of the said oxide over heated alumina, or certain other isomerization catalysts such as the oxygen-containing acids of the elements of the fifth and sixth groups of the periodic system, or anhydrides or salts thereof. In the production of these isomers the catalytic rearrangement of the propylene oxide usually is accompanied by the formation of unsaturated aldehydes and glycols. The former, which are formed by the condensation of two or more molecules of propionaldehyde, are produced in amounts which vary in accordance with the catalyst employed, the time of contact of the oxide with the catalyst, and the reaction temperature. This reaction, of course, may continue so as to form nine or twelve carbon aldehydes, or non-volatile resinous materials which may foul the catalyst, particularly when local overheating of the catalyst occurs. In the practice of the present invention it has been determined that less than 3% of the propionaldehyde reacts in this manner, so that the chief product of this concurrent condensation reaction is the six-carbon aldehyde, methylethylacrolein, which is a valuable byproduct that readily may be converted to the corresponding six-carbon alcohol or acid. Small amounts of glycols sometimes obtained as byproducts in the isomerization apparently are formed by a reaction between propylene oxide and the water formed in the above-mentioned condensation of propionaldehyde. The glycol thus formed may react with additional propylene oxide to form higher glycols.

In its broadest scope the invention relates to the isomerization of a 1,2 alkylene oxide, preferably in the form of its vapor, or of a vaporous mixture of such oxide with an inert diluent, such as nitrogen, carbon dioxide, or water vapor, at elevated temperatures, in the presence of an alum, or of aluminum borate. The catalyst preferably is supported upon an inert supporting means, as hereinafter more fully described.

The term "alum" as herein defined designates any of a series of double sulfates isomorphous with common alum—i. e. potassium aluminum sulfate—in which the potassium may be substituted by sodium, ammonium, lithium, etc., and in which the aluminum may be substituted by chromium, iron, or other trivalent metal. Among such products may be mentioned ammonium aluminum sulfate, potassium aluminum sulfate, sodium aluminum sulfate, potassium chromic sulfate, and potassium ferric sulfate.

For the purpose of retarding or preventing condensation of propionaldehyde, following its formation by the isomerization of the 1,2 propylene oxide, it is desirable to rapidly dissipate the heat evolved in the reaction zone. This may be accomplished by diluting the propylene oxide with an inert gas, such as nitrogen, in suitable amounts. An equally effective heat transfer may be secured by suspending the catalyst in an inert high-boiling liquid, such as "Dowtherm A" (a eutectic mixture of diphenyl and diphenyl oxide), and then passing the oxide vapor through the suspension of catalyst at the desired temperature. According to another form of procedure, the catalyst may be spread in a thin layer over a wide surface area serving as a heat transfer surface. Likewise, the catalyst may be pelleted with a metallic powder such as copper or aluminum dust; or it may be deposited on a metallic support such as copper or aluminum turnings. The catalyst may be supported upon an inert carrier such as "Filtros", kieselguhr, pumice, silica, etc.

One preferred method for preparing the catalyst involves the evaporation to dryness of an aqueous mixture of the active catalytic substance with from 2 to 8 mesh "Filtros" using a ratio of 1 to 0.5 gram of the active catalyst (based on the weight of anhydrous material) to 2 cc. of "Filtros." A small amount of one or more oxidation catalysts, which have no undesirable influence on the isomerization, such as vanadium pentoxide, may be added to the mixture of isomerization catalyst prior to the evaporation to dryness. In general an amount of oxidation catalyst equivalent to 1 or 2% by weight of the active isomerization catalyst has been found satisfactory. This facilitates satisfactory reactivation of the isomerization catalyst upon heating the latter and passing air over it at a high temperature until the organic impurities present on the catalyst are oxidized and removed, largely as water and carbon dioxide. The presence of the oxidation catalyst is desirable, since catalysts of the type employed in the isomerization of the 1,2 alkylene oxides are generally not oxidation catalysts; and it is necessary to carry out the reactivation of these materials at a rather high temperature. Under such conditions, although substantially all of the organic material is removed, the catalyst often fails to regain its original activity, probably due to sintering of the catalyst at the comparatively high temperature employed. The mixture of isomerization catalyst and oxidizing catalyst of the present invention successfully overcomes this defect. Thus, in the absence of an oxidation catalyst, a temperature of about 350° C. has been necessary before removal of the organic impurities from the isomerization catalyst could be effected; whereas, in the presence of an oxidation catalyst, a much more successful reactivation of the isomerization catalyst has been completed at 310° C.

In the modification in which the catalyst is employed in suspension in an inert liquid, this method of revivification by oxidation at high temperatures is not essential, it being sufficient to filter the suspension and wash the catalyst with a fresh portion of the inert liquid.

The temperature at which the isomerization of the 1,2 alkylene oxides is conducted depends somewhat upon the oxide and catalyst used, and generally ranges between 150° C. and 450° C.— the best results being obtained at around 200° to 300° C., particularly in the case of 1,2 propylene oxide.

The following examples will serve to illustrate the invention:

Example 1

A catalyst was prepared by evaporating to dryness an aqueous mixture of potassium aluminum sulfate and "Filtros", (particles of the latter varying roughly from ⅛ to ¼ inch in diameter), using a ratio of .9 gram of the hydrated alum to 1 cc. of "Filtros." This catalyst was placed in a reaction vessel and heated to 250° to 300° C. in a stream of nitrogen to remove residual water. 1,2 propylene oxide vapor was then passed over the catalyst at a temperature of 280° C., and at a rate of 650 grams of oxide per hour per liter of catalyst. The reaction products were condensed by a water-cooled condenser and a supplemental condenser cooled by solid carbon dioxide. 100 parts by weight of 1,2 propylene oxide passed over the catalyst yielded approximately 99 parts of a mixture which was fractionally distilled; and propionaldehyde, allyl alcohol, and unreacted propylene oxide were separately recovered. The mixture consisted approximately of 15% unreacted propylene oxide, 80% propionaldehyde, and 2% allyl alcohol, the residual material being largely unsaturated aldehydes formed by the condensation of propionaldehyde. The overall yield of propionaldehyde was about ten times that obtained in a similar reaction employing a magnesium pyrophosphate catalyst and a temperature of 300° C.; and at a propionaldehyde efficiency almost twice that obtained with the pyrophosphate. The production ratio in terms of grams of propionaldehyde plus grams of allyl alcohol per liter of catalyst per hour, when using this alum catalyst, was over 7.5 times that secured with the pyrophosphate.

Example 2

A mixture of 100 grams of dehydrated potassium aluminum sulfate and 500 grams of "Dowtherm A" were placed in a reaction tube having an internal diameter of approximately 2 inches. 1,2 propylene oxide vapor was passed through the suspension at a temperature of 240° C. and at a rate of 125 grams of the oxide per liter of catalyst per hour. The vapor leaving the reaction tube passed through an air-cooled reflux container under conditions such that the reaction products passed through the condenser, but substantially no Dowtherm was carried over. From 100 parts of propylene oxide practically 100 parts of a mixture were obtained, consisting of approximately 10% unreacted propylene oxide, 88% propionaldehyde, 2% allyl alcohol, and only a trace of unsaturated aldehydes.

Example 3

A catalyst was prepared by evaporating to dryness an aqueous mixture of hydrated ammonium aluminum sulfate and 4- to 8-mesh "Filtros", using a ratio of 1 gram of the alum to 2 cc. of "Filtros." A stream of 1,2 propylene oxide vapors were passed through about 150 cc. of the catalyst mixture maintained in small catalyst tubes heated externally with "Dowtherm A" to a temperature of 290° C. The propylene oxide was fed through the heated zone at a rate of 1.04 liters per liter of catalyst per hour. Overall yields of 84% of propionaldehyde and 2.1% of allyl alcohol were secured, at a propionaldehyde efficiency of 92.3%, and a propionaldehyde plus allyl alcohol efficiency of 94.7%.

Example 4

A catalyst was prepared in a manner similar to that described in Example 3, but using potassium chromic sulfate in place of ammonium aluminum sulfate. 1,2 propylene oxide was passed over this catalyst under the conditions set out in Example 3, but conducting the reaction at 285° C. Overall yields of 62.7% of propionaldehyde and 2.5% of allyl alcohol were secured, at a propionaldehyde plus allyl alcohol efficiency of 93.2%.

Example 5

Employing the procedure described in Example 3, but utilizing potassium ferric sulfate in place of ammonium aluminum sulfate, overall yields of allyl alcohol were obtained that were more than three times that secured with the use of ammonium aluminum sulfate, together with a substantially lower yield of propionaldehyde, at a propionaldehyde plus allyl alcohol efficiency around 80%.

1% to 2%, or even more, of vanadium pentoxide or other oxidation catalyst, based on the weight of the isomerization catalyst, may be employed with the catalyst set out in any of the above-mentioned examples. The amount of oxidation catalyst used should not be so great as to exert an undesirable influence upon the isomerization.

Example 6

An aluminum borate catalyst was prepared as described in Example 1, using a ratio of 1 gram of aluminum borate to 2 cc. of "Filtros." After drying the catalyst, 1,2 propylene oxide vapor was passed over it in a reaction zone maintained at a reaction temperature of 280° C., at the rate of 900 grams of the oxide per liter of catalyst per hour. The reaction products were condensed in the manner described in Example 1; and the condensate was fractionally distilled. From 100 parts of 1,2 propylene oxide passed over the catalyst, 95 parts of a mixture was obtained which consisted of approximately 44% of unreacted propylene oxide, 50% propionaldehyde, and 4% allyl alcohol, the remainder being chiefly unsaturated aldehydes and glycols.

While the foregoing examples relate to the isomerization of 1,2 propylene oxide, it will be understood that the present invention is adapted also for use in the isomerization of other 1,2 alkylene oxides, particularly those having from two to four carbon atoms in the molecule, such as ethylene oxide and 1,2 butylene oxide, and the catalysts of the invention are not limited in their utility to the isomerization of 1,2 propylene oxide.

The invention is susceptible of modification within the scope of the appended claims.

We claim:

1. Process for the isomerization of 1,2 alkylene oxides having from two to four carbon atoms in the molecule, which comprises passing vapors of such an alkylene oxide, at a temperature within the range of from about 150° to about 450° C. into contact with an alum.

2. Process for the isomerization of 1,2 alkylene oxides having from two to four carbon atoms in the molecule, which comprises passing vapors of such an alkylene oxide, at a temperature within the range of from about 150° to about 450° C. into contact with an alum, in the presence of an oxidation catalyst, and recovering the saturated aldehyde thus produced.

3. Process for the production of aldehydes and alcohols from a 1,2 alkylene oxide containing from two to four carbon atoms in the molecule, which comprises the steps of rapidly passing the vapors of the said oxide through a body of a high-boiling inert liquid containing suspended therein a solid catalyst for the isomerization of the said oxide, the said liquid being maintained at a temperature within the range of from 150° to 450° C., and condensing the resultant reaction products.

4. Process of the production of aldehydes and alcohols from a 1,2 alkylene oxide containing from two to four carbon atoms in the molecule, which comprises the steps of rapidly passing the vapors of the said oxide through a body of a high-boiling inert liquid containing suspended therein an alum, the said liquid being maintained at a temperature within the range of from about 150° to about 450° C., and removing and condensing the resultant vaporous reaction products.

5. Process for the isomerization of 1,2 propylene oxide, which comprises passing 1,2 propylene oxide at a temperature of from about 150 to about 450° C. into contact with an alum, in the presence of an oxidation catalyst.

6. Process for the isomerization of 1,2 propylene oxide, which comprises passing 1,2 propylene oxide at a temperature of from about 150 to about 450° C. into contact with an alum.

7. Process for the production of porpionaldehyde, which comprises passing vapors of 1,2 propylene oxide at a temperature within the range from about 150° to about 450° C. into contact with an alum, condensing the resultant vaporous reaction products, and separately recovering therefrom the propionaldehyde.

8. Process for the production of propionaldehyde, which comprises passing vapors of 1,2 propylene oxide at a temperature within the range from about 200° to about 300° C. into contact with an alum, condensing the resultant vaporous reaction products, and separately recovering therefrom the propionaldehyde.

9. Process for the production of propionaldehyde, which comprises passing vapors of 1,2 propylene oxide at a temperature within the range from about 150° to about 450° C. over an alum, condensing the vaporous reaction products, and separately recovering therefrom the propionaldehyde.

10. Process for the production of propionaldehyde, which comprises passing vapors of 1,2 propylene oxide at a temperature within the range from about 150° to about 450° C. over potassium aluminum sulfate, condensing the vaporous reaction products, and separately recovering therefrom the propionaldehyde.

11. Process for the production of propionaldehyde, which comprises passing vapors of 1,2 propylene oxide at a temperature within the range from about 150° to about 450° C. over sodium aluminum sulfate, condensing the vaporous reaction products, and separately recovering therefrom the propionaldehyde.

12. In a process for the production of aldehydes and alcohols by the isomerization of a 1,2 alkylene oxide having two to four carbon atoms in the molecule, the use of a catalyst essentially comprising an alum and a small proportion of an oxidation catalyst.

GEORGE H. LAW.
RAYMOND W. McNAMEE.